US012586165B2

(12) United States Patent
Jeon et al.

(10) Patent No.: US 12,586,165 B2
(45) Date of Patent: Mar. 24, 2026

(54) APPARATUS AND METHOD FOR RECONSTRUCTING IMAGE USING MOTION DEBLURRING

(71) Applicant: RESEARCH & BUSINESS FOUNDATION SUNGKYUNKWAN UNIVERSITY, Suwon-si (KR)

(72) Inventors: Byeung Woo Jeon, Seongnam-si (KR); Jae Lin Lee, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 301 days.

(21) Appl. No.: 18/218,266

(22) Filed: Jul. 5, 2023

(65) Prior Publication Data

US 2024/0311982 A1      Sep. 19, 2024

Related U.S. Application Data

(60) Provisional application No. 63/452,483, filed on Mar. 16, 2023.

(51) Int. Cl.
*G06T 5/73* (2024.01)
*G06T 3/4015* (2024.01)
(Continued)

(52) U.S. Cl.
CPC .............. *G06T 5/73* (2024.01); *G06T 3/4015* (2013.01); *G06T 7/20* (2013.01); *G06V 10/141* (2022.01); *G06V 10/56* (2022.01)

(58) Field of Classification Search
CPC ........... G06T 5/73; G06T 3/4015; G06T 7/20; G06T 2207/10016; G06T 2207/10024;
(Continued)

(56) References Cited

U.S. PATENT DOCUMENTS 8,649,626 B2 *   2/2014   Tsutsumi .................. G06T 5/73
                                                          348/208.13
10,176,558 B2    1/2019   Uliyar et al.
(Continued)

FOREIGN PATENT DOCUMENTS

KR     10-2014-0055503 A     5/2014
KR        10-2234893 B1     4/2021
KR     10-2021-0074010 A     6/2021

OTHER PUBLICATIONS

S. Harshavardhan, S. Gupta and K. S. Venkatesh, "Flutter shutter based motion deblurring in complex scenes," 2013 Annual IEEE India Conference (INDICON), Mumbai, India, 2013, pp. 1-6, (Year: 2013).*
(Continued)

*Primary Examiner* — Kathleen Y Dulaney

(57) ABSTRACT

A method of reconstructing an image using motion deblurring according to the present invention includes the steps of: modulating a first raw image using Coded Exposure Photography (CEP); and decomposing the first raw image into at least one color channel image, wherein the step of modulating a first raw image using Coded Exposure Photography (CEP) includes modulating the first raw image using a coded pattern determined according to a motion and arrangement of a color filter array (CFA).

6 Claims, 11 Drawing Sheets

(51) Int. Cl.
  *G06T 7/20*      (2017.01)
  *G06V 10/141*    (2022.01)
  *G06V 10/56*     (2022.01)

(58) Field of Classification Search
  CPC .......... G06T 2207/10144; G06T 2207/20201;
                            G06V 10/141; G06V 10/56
  USPC .............. 382/263, 254, 312; 348/208.4, 367
  See application file for complete search history.

(56)             References Cited

U.S. PATENT DOCUMENTS

| | | | | |
|---|---|---|---|---|
| 11,676,250 | B1 * | 6/2023 | Price | G06T 3/4015 |
| | | | | 348/239 |
| 11,880,984 | B2 * | 1/2024 | Jayasuriya | G06T 7/20 |
| 2011/0050920 | A1 * | 3/2011 | Siddiqui | H04N 23/68 |
| | | | | 348/208.6 |
| 2011/0216211 | A1 * | 9/2011 | Jelinek | H04N 23/6845 |
| | | | | 348/E5.037 |
| 2012/0069225 | A1 * | 3/2012 | McCloskey | H04N 23/73 |
| | | | | 348/241 |
| 2012/0086822 | A1 * | 4/2012 | Ishii | G06T 5/73 |
| | | | | 348/208.6 |
| 2017/0061586 | A1 * | 3/2017 | Uliyar | H04N 23/80 |
| 2017/0352136 | A1 | 12/2017 | Uliyar et al. | |
| 2019/0154834 | A1 * | 5/2019 | Heidrich | G01S 17/89 |
| 2019/0199929 | A1 * | 6/2019 | Sekine | H04N 25/532 |
| 2021/0390669 | A1 * | 12/2021 | Jayasuriya | H04N 19/20 |
| 2022/0239822 | A1 * | 7/2022 | Genov | G01S 7/4816 |
| 2022/0417435 | A1 * | 12/2022 | Jeon | G06T 5/50 |
| 2022/0417475 | A1 * | 12/2022 | Jeon | H04N 23/73 |
| 2024/0096049 | A1 * | 3/2024 | Saini | G06T 17/05 |

OTHER PUBLICATIONS

Raskar et al, "Coded Exposure Photography: Motion Deblurring using Fluttered Shutter", ACM Transaction on Graphics, Jul. 2006 pp. 795-804. (Year: 2006).*

Liang, Chih-Hung, et al. "Raw image deblurring." *IEEE Transactions on Multimedia* 24 (2020): pp. 61-72.

Lee, Jaelin et al. "Point Spread Function Optimization for Motion Deblurring with External High-speed Lighting." *Proceedings of the Korean Society of Broadcast Engineers Conference.* The Korean Institute of Broadcast and Media Engineers, 2019.

* cited by examiner

FIG. 3

Experimental results (a) Ground truth (b) Raw image with motion blur (c) Color image reconstructed from (b)

(d) Color image deblurring result using traditional method 1

(e) Color image deblurring result using traditional method 2

(f) Proposed raw image deblurring result

APPARATUS AND METHOD FOR RECONSTRUCTING IMAGE USING MOTION DEBLURRING

CROSS-REFERENCE TO RELATED APPLICATIONS

This application claims the priority benefit of U.S. patent application No. 63/452,483 filed on Mar. 6, 2023 in the US Intellectual Property Office, the disclosures of which are incorporated herein by reference.

BACKGROUND

1. Field

The present invention relates to an apparatus for reconstructing an image using motion deblurring and a method thereof, and more particularly, to an apparatus for reconstructing a clear color image by performing Image Signal Processing (ISP) after removing motion blur from a raw image, and a method thereof.

2. Description of the Related Art

When an image is acquired using a color camera, motion blur may occur in the image due to movement of an object or the camera. A technique for removing the motion blur may be referred to as motion deblurring, and according to the purpose of photographing, capturing a clear image without motion blur in an image (still image or video) would be ideal.

When an object to be captured moves, motion blur may increase according to the exposure time of the shutter, and therefore, reducing the exposure time may be one of the methods that reduce the motion blur. However, since intensity of a light signal that the camera sensor receives is reduced when an image is captured with a short exposure time, another problem of increasing noise may be generated when images are captured in an environment with low illuminance.

Conventionally, motion deblurring techniques have been developed to remove motion blur from an image captured during an appropriate exposure period without reducing the exposure time. In relation thereto, conventional US Patent Publication No. US2017/0352136A1 (METHOD, APPARATUS AND COMPUTER PROGRAM PRODUCT FOR MOTION DEBLURRING OF IMAGES, Dec. 7, 2017) discloses a motion deblurring algorithm that performs deconvolution based on information on the exposure time of images captured by a plurality of cameras. However, noises that may occur in the reconstruction process due to the characteristics of color images are not disclosed, and a method of removing noise is not disclosed at all.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The present invention has been made to solve the problem of noise generated when color images are reconstructed using conventional motion deblurring as described above, and it is an object of the present invention to provide an apparatus for reconstructing an image using motion deblurring and a method thereof, which can improve performance of reconstructing a clear color image by performing an ISP process after performing motion deblurring on a raw image.

To accomplish the above object, according to one aspect of the present invention, there is provided a method of reconstructing an image using motion deblurring, the method comprising the steps of: modulating a first raw image using Coded Exposure Photography (CEP); and decomposing the first raw image into at least one color channel image, wherein the step of modulating a first raw image using Coded Exposure Photography (CEP) includes modulating the first raw image using a coded pattern determined according to a motion and arrangement of a color filter array (CFA).

According to embodiments, the method may further comprise the step of generating a coded pattern considering at least any one among a global motion generated by a relative motion between a scene of the first raw image and a camera, a local motion of an object, and the color filter array (CFA) in the camera.

According to embodiments, the method may further comprise the step of modulating motion blur while opening and closing a shutter of the camera according to a coded shutter, or modulating motion blur while performing on/off switching of a lighting device or changing brightness of the lighting device according to coded illumination.

According to embodiments, the method may further comprise the steps of: performing a deblurring process on the decomposed color channel images and then composing the decomposed color channel images into a second raw image; and performing image signal processing (ISP) on the composed second raw image.

In addition, an image reconstruction apparatus using motion deblurring according to the present invention comprises: a communication unit for receiving a first raw image from a camera; and a control unit for modulating the first raw image using Coded Exposure Photography (CEP), wherein the control unit modulates the first raw image using a coded pattern determined according to a motion and arrangement of a color filter array (CFA).

According to embodiments, the control unit may generate the coded pattern considering at least any one among a global motion generated by a relative motion between a scene of the first raw image and a camera, a local motion of an object, and the color filter array (CFA) in the camera.

According to embodiments, the control unit may modulate motion blur while opening and closing a shutter of the camera according to a coded shutter, or modulating motion blur while performing on/off switching of a lighting device or changing brightness of the lighting device according to coded illumination.

According to embodiments, the control unit may decompose the first raw image into at least one color channel image, perform a deblurring process on the decomposed color channel images and then composing the decomposed color channel images into a second raw image, and perform image signal processing (ISP) on the composed second raw image.

According to embodiments, the communication unit may receive the first raw image on the basis of motion information acquired using at least one among a speedometer and a gyro sensor.

The apparatus for reconstructing an image using motion deblurring and a method thereof provided as an embodiment of the present invention may minimize loss of raw data and improve reconstruction performance of a clear color image.

According to an embodiment of the present invention, image reconstruction performance can be improved by using illumination outside the camera.

Meanwhile, the effects of the present invention are not limited to the effects mentioned above, and various effects may be included within a range apparent to those skilled in the art from the contents described below.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 3 is a view for explaining noise generated by demosaicking according to an embodiment of the present invention.

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1A:
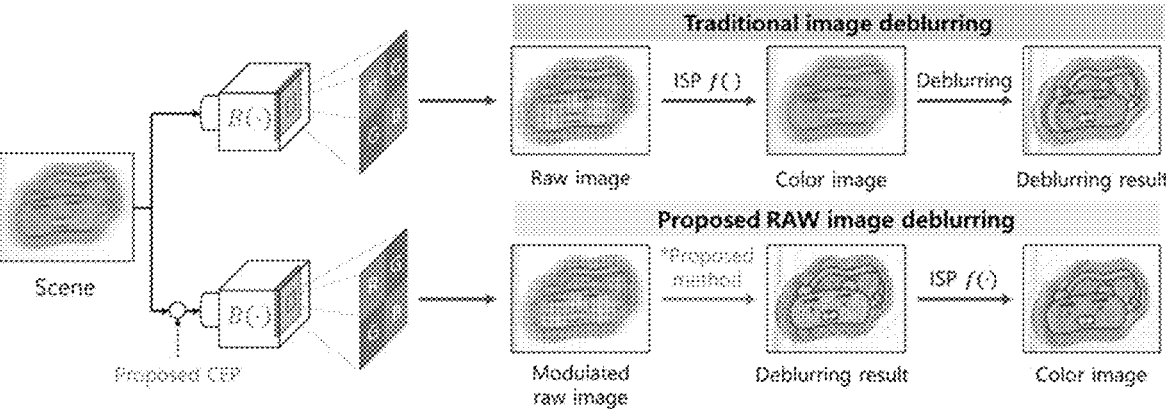
FIG. 1A and FIG. 1B are views for explaining the difference between an apparatus for reconstructing an image using motion deblurring and a method thereof according to an embodiment of the present invention and the prior art.

Hereinafter, terms used in this specification will be described briefly, and the configuration and operation of preferred embodiments of the present invention will be described in detail as specific contents for carrying out the present invention.

Although the terms used in this specification have been selected from general terms widely used in the present as much as possible while considering the functions used in the present invention, they may vary according to the intention of a technician working in this field, precedents, or advent of new techniques. In addition, in a specific case, there may also be terms arbitrarily selected by the applicant, and in this case, meanings thereof will be described in detail in corresponding descriptions of the present invention. Therefore, the terms used in the present invention are not simply names of terms, but should be defined on the basis of meaning of the terms and the overall contents of the present invention.

When it is said that a certain part "includes" a certain component throughout the specification, it means that other components may be further included, rather than excluding other components, unless stated otherwise. In addition, terms such as " . . . unit", "module", and the like described in the specification mean a unit that processes at least one function or operation, and this may be implemented as hardware, software, or a combination of hardware and software. In addition, when a part is said to be "connected" to another part throughout the specification, this also includes a case of being connected "with another component in between", in addition to a case of being "directly connected".

Hereinafter, embodiments of the present invention will be described in detail so that those skilled in the art may easily practice with reference to the accompanying drawings. However, the present invention may be implemented in various different forms and is not limited to the embodiments described herein. In addition, in order to clearly explain the present invention in the drawings, parts irrelevant to the description are omitted, and similar reference numerals are attached to similar parts throughout the specification.

Hereinafter, specific embodiments of the present invention will be described with reference to the drawings.

Figure 1B:
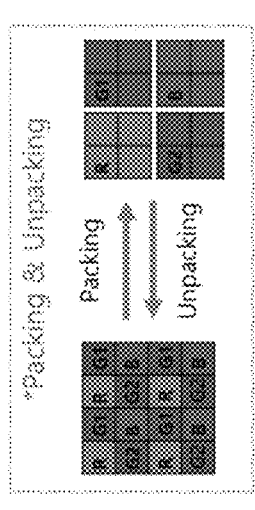
Figure 1B:
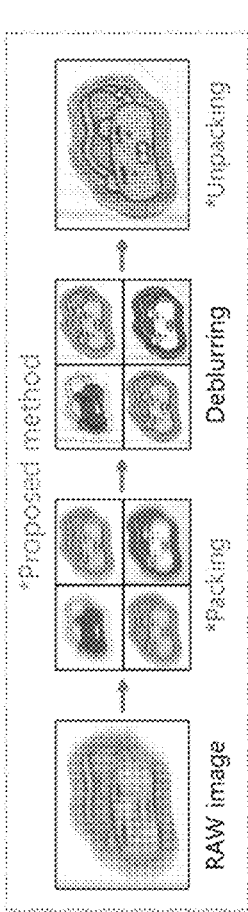
Figure 2:
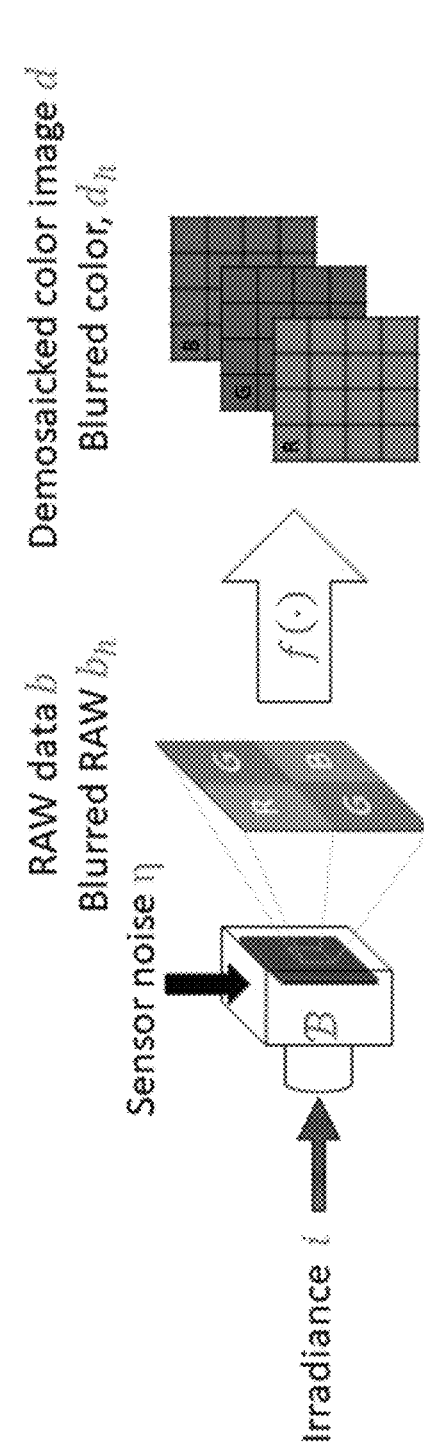
FIG. 2 is a view for explaining parameters used in an apparatus for reconstructing an image using motion deblurring and a method thereof according to an embodiment of the present invention.
Figure 3:
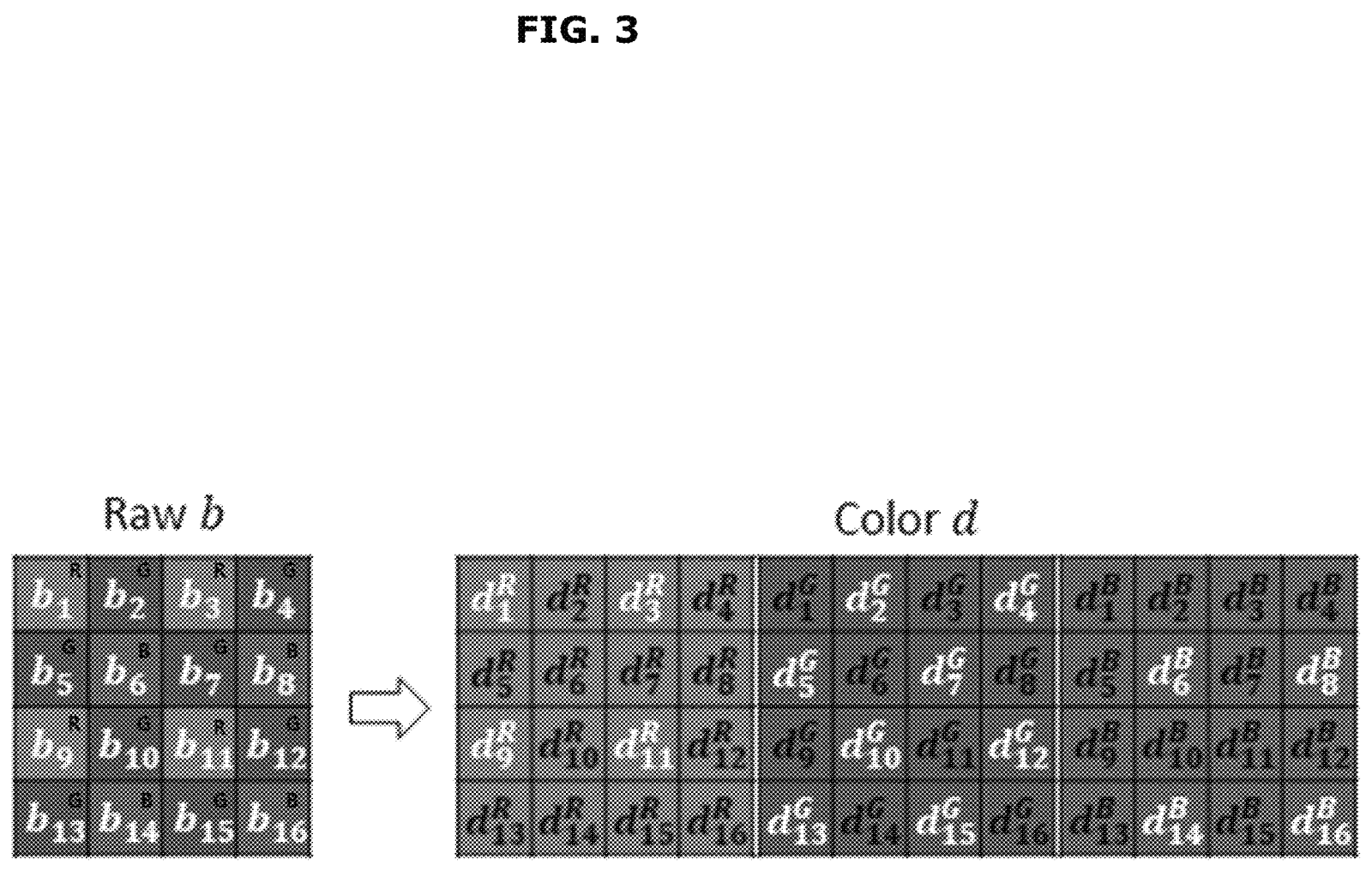

First, the difference between an apparatus for reconstructing an image using motion deblurring and a method thereof according to an embodiment of the present invention and the prior art is described in FIG. 1A and FIG. 1B, and parameters used in an apparatus for reconstructing an image using motion deblurring and a method thereof according to an embodiment of the present invention are defined with reference to FIGS. 2 and 3, and then the problems described in FIG. 1A and FIG. 1B will be described in detail using corresponding parameters. Subsequently, an apparatus for reconstructing an image using motion deblurring and a method thereof according to an embodiment of the present invention will be described in FIGS. 4 to 6, and effects of an apparatus for reconstructing an image using motion deblurring and a method thereof according to an embodiment of the present invention will be described in FIGS. 7 and 8.

FIG. 1A is a view for explaining the difference between an apparatus for reconstructing an image using motion deblurring and a method thereof according to an embodiment of the present invention and the prior art, and FIG. 1B is a view for explaining an apparatus for reconstructing an image using motion deblurring according to an embodiment of the present invention.

Referring to FIG. 1A, when motion deblurring is performed in the prior art, a clear image is reconstructed by applying a deblurring algorithm to color demosaiced data generated from raw image data (raw data, raw mosaic data) of a single channel through Image Signal Processing (ISP).

Specifically, when a camera sensor (or image sensor) receives light, it converts light energy into electrical energy to generate an image, and the image generated at this point may be defined as raw data and referred to as raw mosaic data as it has a black and white image or gray image of a mosaic shape.

According to embodiments, the camera sensor may be a CMOS Image Sensor (CIS) or a CCD sensor, but the embodiments of the present invention are not limited to the types of an image sensor. In addition, according to embodiments, the raw image data may be Bayer pattern data, which is a signal of an RGGB pattern of a color filter array (CFA), but the embodiments of the present invention are not limited to the types of the color filter array.

An ISP process may refer to image processing that collectively refers to a plurality of processes for reconstructing a raw image into a color image. Specifically, the ISP process may include various linear and nonlinear processes such as gamma correction, white balancing, and the like.

Through the nonlinear processing, two problems may be generated in a multi-channel color image (color demosaiced data) generated from a raw image.

First, accurate estimation of a point spread function (PSF) is difficult due to non-linearization of signal intensity such as gamma correction or the like, and second, as an interpolation process such as demosaicking or the like that interpolates a color for each pixel is performed on the raw image data, accurate estimation of the point spread function is difficult, and thus deconvolution noise may be generated.

Therefore, when motion deblurring is performed on a color image having such a problem, noise may be generated during the reconstruction process as the PSF cannot be accurately estimated from an existing image model.

That is, when a clear color image is reconstructed from a color image, not a raw image, through motion deblurring, problems according to noise may be generated.

Therefore, an apparatus for reconstructing an image using motion deblurring and a method thereof according to an embodiment of the present invention is an embodiment of reconstructing a clear color image from a raw image for solving the problem, and may include a technique for modulating PSF to enable motion deblurring on a raw image using a Coded Exposure Photography (CEP) technique as shown in FIGS. 1A and 1B.

According to embodiments, an object of the apparatus for reconstructing an image using motion deblurring and a method thereof according to an embodiment of the present invention is to reconstruct a clear color image by packing a raw image before performing as ISP process, demosaicking after performing motion deblurring on the packed images, and unpacking the packed images.

Compared to the conventional technique of reconstructing a clear color image from a color image, the apparatus for reconstructing an image using motion deblurring and a method thereof according to an embodiment of the present invention may minimize loss of original signals and maximize performance of reconstructing a clear color image by removing motion blur from a raw image and reconstructing a clear image.

FIG. 2 is a view for explaining parameters used in an apparatus for reconstructing an image using motion deblurring and a method thereof according to an embodiment of the present invention, and FIG. 3 is a view for explaining noise generated by demosaicking according to an embodiment of the present invention. In FIG. 3, white letters are observation signals, and black letters are pseudo signals interpolated by demosaicking.

With reference to FIGS. 2 and 3, parameters used in an apparatus for reconstructing an image using motion deblurring and a method thereof according to an embodiment of the present invention are defined, and the problems described in FIG. 1A and FIG. 1B will be described in detail using the parameters.

According to embodiments, since a motion of an image may be defined by the relation between a scene and a camera, and an image with an actually acquired motion (or motion blur) is an image in which a clear image without motion is spread, the motion may be referred to as a point spread function (PSF).

At this point, it may be defined such that irradiance entering the camera is i, a raw image acquired by passing through the optical structure of the camera is b, a raw image with motion blur is $b_h$, a color image interpolated through the ISP process is d, a color images with motion blur is $d_h$, motion blur (or PSF of an image) is h, noise generated in the optical structure of the camera is $\eta$, a luminance signal transfer function according to the color filter array (CFA) of the camera is $B(\cdot)$, a function expressing the gamma correction of the camera is $G(\cdot)$, a function expressing the demosaicking process of the camera is $D(\cdot)$, and a function expressing the entire ISP process of the camera is $f(\cdot)$.

Meanwhile, since the motion blur spreads to images acquired during the exposure period, conventionally, a color image $d_h$ with motion blur may be defined as a convolution relation between a color image d interpolated through the ISP process and the motion blur h, and it may be defined as shown in Equation 1 considering even the noise n generated in the optical structure of the camera.

$$d_h = d * h + \eta \qquad \text{[Equation 1]}$$

operation may indicate convolution, and a clear image without motion blur may be calculated through deconvolution as shown in Equation 2.

$$d = d_h * h^{-1} \qquad \text{[Equation 2]}$$

Here, $h^{-1}$ is the inverse filter of h, and convolution with the inverse filter may be defined as deconvolution.

The conventional problem may be attributed to the fact that deblurring is performed in a color area, and the problem is that a color image is generated from a raw image through a nonlinear ISP process such as gamma correction, demosaicking, or the like, and signals may be modulated in this process. Furthermore, Equation 1 that does not consider the ISP process does not express a color image well, and accordingly, unexpected noise may be generated in a clear color image reconstructed using equations 1 and 2 of the prior art.

First, noise generated by gamma correction during the nonlinear ISP process is confirmed. Gamma correction may indicate a process of non-linearly changing the intensity signal of light using a non-linear transfer function, and according to embodiments, gamma correction may be converted by Equation 3 below.

$$G(x) = x^{1/\gamma} \qquad \text{[Equation 3]}$$

In Equation 3, x may indicate an input image, and an image acquired as a result of gamma correction on a color image $d_h$ with motion blur modeled as Equation 1 may be indicated as $d_h^{1/\gamma}$, and accordingly, the image $d_h^{1/\gamma}$ acquired as a result of gamma correction on a color image $d_h$ with motion blur may be expressed as Equation 4. Since the main consideration is gamma correction, it is assumed that there is no noise.

$$d_h^{1/\gamma} = d_h + \left(d_h^{1/\gamma} - d_h\right) \qquad \text{[Equation 4]}$$

When deconvolution is performed to reconstruct a clear image, the result may be expressed as shown in Equation 5.

$$d_h^{1/\gamma} * h^{-1} = d_h * h^{-1} + \left(d_h^{1/\gamma} - d_h\right) * h^{-1} = d + \left(d_h^{1/\gamma} - d_h\right) * h^{-1} \qquad \text{[Equation 5]}$$

As shown in Equation 5, when deblurring is performed on a gamma-corrected image, signal $(d_h^{1/\gamma} - d_h) * h^{-1}$ is added to the clear image d, and this may indicate generation of noise that causes a ringing artifact.

Second, noise generated by demosaicking during the nonlinear ISP process is confirmed. Demosaicking may generally indicate an interpolation technique for generating a multi-channel color image in a commonly used color space such as sRGB, Adobe RGB, or the like from mosaicked raw images that have passed through a Bayer pattern color filter. According to embodiments, a linear interpolation method may be used for high-speed demosaicking, and for example, demosaicking by an Adaptive Homogeneity Demosaicking (AHD) algorithm may be used. Demosaicking algorithms have been developed to minimize a phenomenon called as a zipper artifact, and motions are not considered. However, when an interpolated signal is different from an actual signal, deblurring noise may be generated, and a mimetic view of an image interpolated from a raw image to a 3-channel color image may be shown in FIG. 3.

Referring to FIG. 3, the raw image Raw b on the left side of FIG. 2 may be an image acquired by a camera with a Bayer pattern color filter array. When the raw image is demosaiced to generate a color image, it may be generated through interpolation from a 1-channel raw image into a 3-channel color image.

Describing the interpolation process in more detail, first, a 1-channel raw image may be copied to each color channel of the same location. That is, a pixel value that has passed through a specific color sensor in the raw image data may be copied to a channel image of a color the same as that of the color sensor in the color image. For example, since value $b_{11}$ in the raw image is a value that has passed through a red sensor in FIG. 3, the value may be copied to $d_{11}$ at the same location in the red channel image of color image d $(b_{11} \rightarrow d_1^R)$.

On the other hand, signals in the color image other than the signals copied from the raw data, which are expressed as black letters in color image d on the right side of FIG. 3, are generated through an interpolation algorithm. According to embodiments, there may be a pixel doubling interpolation or a bilinear interpolation, and for example, $d_O^R$ of R channel may be reconstructed through an interpolation algorithm using a value copied from ambient raw signals. When an image is reconstructed using bilinear interpolation, it may be reconstructed through $$d_0^R = (b_1 + b_3 + b_9 + b_{11})/4.$$

The color image $d_n$ with demosaiced motion blur may be modeled as shown below in Equation 6.

$$d_h = D(B(i * h) + \eta) \qquad \text{[Equation 6]}$$

Here, the demosaicking function D may indicate $D(\cdot)$ expressing the demosaicking process of the camera, the CFA function B of the camera sensor may indicate the luminance signal transfer function $B(\cdot)$ according to the color filter array of the camera, and the irradiance i may indicate irradiance entering the camera. According to Equation 6, it can be confirmed that the color image $d_h$ with demosaiced motion blur does not mean a convolution relation between the clear color image d and the motion blur (or PSF of the image, h). That is, in order to reconstruct a clear color image d, PSF(h) should be estimated by calculating the inverse function of D and B. However, it is impossible to calculate the inverse matrix of B unless all information about the camera and ambient illumination is provided in advance. Function B for the color filter of the camera may be modeled as shown in below Equation 7.

$$b[n] = B(i[n]) = \sum_F \int_\lambda \int_{n-1/2}^{n+1/2} C_F(\lambda)E(\lambda, x)\Gamma(\lambda, x)dxd\lambda \qquad \text{[Equation 7]}$$

Here, n may indicate an index of a pixel in an image, and F may indicate each color of the color filter array (CFA). For example, in the case of a Bayer pattern color filter array (CFA), it may be $F \in \{Red, Green, Blue\}$. $C_F$ may indicate a filter coefficient according to the wavelength of the CFA, E may indicate the intensity or brightness of illumination according to the wavelength, and $\Gamma$ may indicate the reflectance of an object in a scene. From Equation 7, filter coefficient $C_F$ should be known for each frequency spectrum in order to obtain brightness i $(i[n]=\int_\lambda \int_{n-1/2}^{n+1/2} E(\lambda, x)\Gamma(\lambda, x)dxd\lambda)$ of a scene expressed as the reflectance $\Gamma$ of the scene and the intensity E of illumination. That is, since a single signal b is expressed as a plurality of equations (multiplication operation for each spectrum), calculating an inverse function of $B(\cdot)$ may have various ill-posed problems. However, when it is temporarily assumed that an inverse function of $B(\cdot)$ can be calculated to grasp the noise generated by demosaicking, an ideal color image $\overline{d}$ that does not require an interpolation process of demosaicking may be modeled as shown in Equation 8.

$$\overline{d}_h = \overline{B}(t * h) \qquad \text{[Equation 8]}$$

Here, $\overline{B}$ indicates the transfer function of an ideal color filter array, i.e., it means a case of simultaneously acquiring signals of three color-channels per pixel since each of color sensors of R, G, and B exists at the same spatial location, and there is a Foveon color filter array as an embodiment implemented similarly in the structure.

The color image interpolated through Equations 6 and 8 may be expressed again as shown below in Equation 9.

$$d_h = \overline{d}_h + \left(d_h - \overline{d}_h\right) \qquad \text{[Equation 9]}$$

When it is assumed that there is no noise in the image itself by limiting the noise to the noise generated by demosaicking, a clear color image calculated based on Equation 9 may be produced as shown in Equation 10.

$$\bar{d} = \bar{B}\left(\bar{B}^{-1}(d_h) * h^{-1}\right) \qquad \text{[Equation 10]}$$
$$= \bar{B}\left(\bar{B}^{-1}\left(\bar{d}_h + (d_h - \bar{d}_h)\right) * h^{-1}\right)$$
$$= d + \left(\bar{B}^{-1}\left(d_h - \bar{d}_h\right) * h^{-1}\right)$$

In Equation 10, when a signal interpolated by demosaicking is different from a signal of an ideal color image, i.e., when $d_h - \bar{d}_h$ is not 0, noise is generated, and quality of the image may be lowered.

That is, referring to Equations 5 and 10, as a nonlinear ISP process, it is confirmed that noise may be generated when a clear color image is reconstructed from a color image generated through gamma correction and demosaicking.

Figure 4:
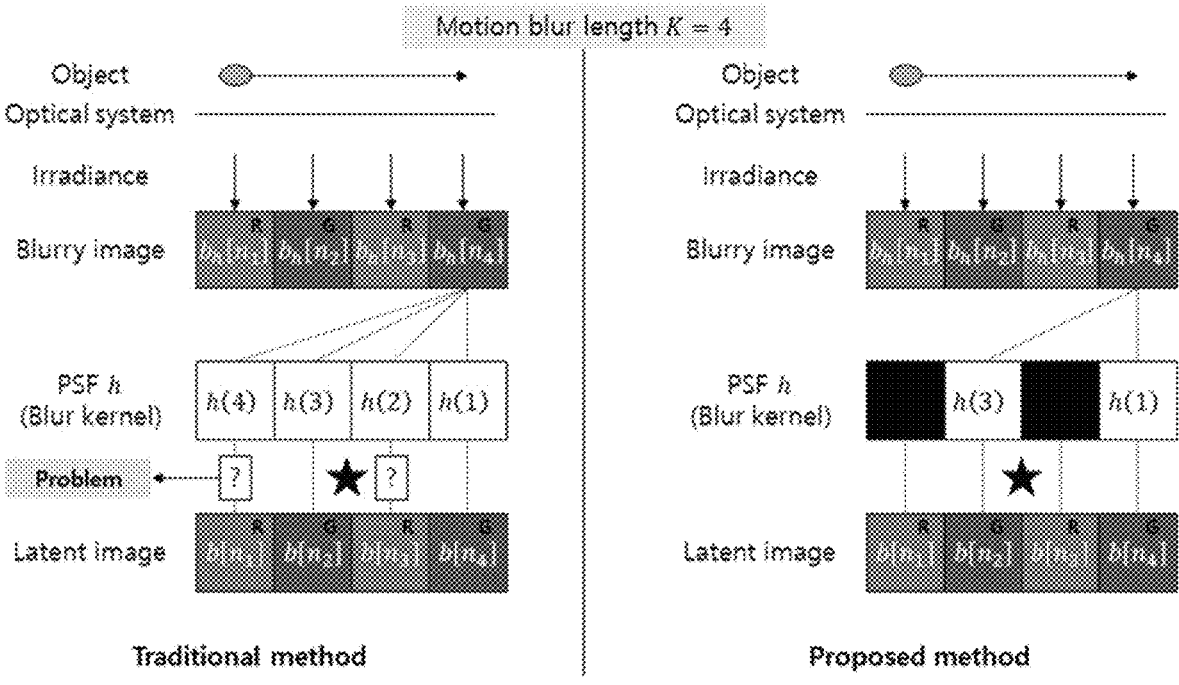
FIG. 4 is a view for explaining a method of performing motion deblurring using a point spread function (PSF) through coded exposure photography (CEP) according to an embodiment of the present invention.

FIG. 4 is a view for explaining a method of performing motion deblurring using PSF through CEP according to an embodiment of the present invention.

As is confirmed in FIGS. 2 and 3, an image signal may be nonlinearly modulated in an ISP process such as gamma correction, demosaicking, or the like. In this case, it is difficult to accurately express a color image using Equation 1, which is a conventional image acquisition model. Therefore, in order to explain an apparatus for reconstructing an image using motion deblurring and a method thereof according to an embodiment of the present invention, an image acquisition model is modeled as shown below in Equation 11.

$$d_h = f(B(i * h) + \eta) \qquad \text{[Equation 11]}$$

In Equation 11, i may indicate a luminance signal according to irradiance entering the camera, and B may indicate a luminance signal transfer function for generating raw image b as the luminance signal i passes through the color filter array (CFA) of the camera. Function f indicating the entire ISP process of the camera may indicate the process of image processing from a raw image to a color image, and according to embodiments, it may include at least any one process among quantization, linearization, gamma correction, white balancing, and demosaicking. A clear color image d to be finally acquired may be expressed as d=f(b)=f(B(i)). The clear color image d may be calculated from Equation 11 through Equation 12 shown below.

$$d = f\left(B\left(B^{-1}\left(f^{-1}(d_h)\right) * h^{-1}\right)\right) \qquad \text{[Equation 12]}$$

As described in Equation 7, since calculating the inverse function $B^{-1}$ of $B(\cdot)$ may have several ill-posed problems, Equation 12 may also have several ill-posed problems.

Accordingly, an apparatus for reconstructing an image using motion deblurring and a method thereof according to an embodiment of the present invention may generate a clear color image by performing deblurring on a raw image by modulating motion blur h without the need of calculating the inverse function $B^{-1}$ of B. As another embodiment, an apparatus for reconstructing an image using motion deblurring and a method thereof may also include a method of generating a color image from a raw image through end-to-end machine learning on the basis of Equations 5 and 10.

In Equation 11, B(i*h) may indicate a raw image $b_h$ having motion blur, and may be calculated as shown in Equation 13.

$$b_h[n] = B((i * h)[n]) = \sum_{k=1}^{K} B(i[n-k+1]h[k]) \qquad \text{[Equation 13]}$$

As shown in FIG. 3, in the Bayer pattern, each color filter is distributed at intervals of two spaces. That is, the color filter array is configured of R-G rows and G-B rows, and in the case of an R-G row, there is an R color filter when the position is an odd number and a G color filter when the position is an even number. Therefore, Equation 13 may be expressed as Equation 14 shown below.

$$b_h[n] = \sum_{k=1}^{K/2} B(i[n-2k+2]h[2k-1] + i[n-2k+1]h[2k]) \qquad \text{[Equation 14]}$$

In Equation 14, n is divided into a case of odd number $n_1$ and a case of even number $n_2$, and the luminance signal transfer function B according to CFA a is divided into a case a an odd number $B_1$ and a case of even number $B_2$, and when the color filter is an R-G row, the Bayer pattern function $B_1$ that generates signal $b_h[n_1]$ of an odd-numbered position means a function for the color filter of R, and $b_h[n_1]$ may be expressed as shown in Equation 15.

$$b_h[n_1] = \sum_{k=1}^{\frac{K}{2}} B_1\left( \begin{array}{c} i[n-2k+2]h[2k-1] + \\ i[n_1-2k+1]h[2k] \end{array} \right) \qquad \text{[Equation 15]}$$
$$= \sum_{k=1}^{K/2} b[n_1-2k+2]h[2k-1] +$$
$$\sum_{k=1}^{\frac{K}{2}} B_1\left(B_2^{-1}(b[n_1-2k+1])h[2k]\right)$$

In Equation 15, since $i[n_1-2k+2]$ is spaced apart from $n_1$ at intervals of 2 spaces, it is a signal at a position to which a filter of a color the same as that of $b_h[1]$ is applied in a clear raw image b. On the other hand, although $i[n_1-2k+1]$ needs a process of $B_2^{-1}$ as shown in Equation 15 since a color filter of a different color is applied, an inverse function of B cannot be calculated as is described in Equation 7. That is, convolution of motion and scene and $b_h[n_1]$ expressed as $B(\cdot)$ may not be simply expressed as a convolution relation, and this means that deconvolution alone may not calculate a clear raw image. Similarly, $b_h[n_2]$ also requires $B_1^{-1}$, in addition to deconvolution, to calculate a clear raw image.

Accordingly, the apparatus for reconstructing an image using motion deblurring and a method thereof according to an embodiment of the present invention may omit the process of calculating an inverse function of B by modulating the PSF using Coded Exposure Photography (CEP). The PSF may indicate a relation between a scene and a camera, in other words, may be defined as a function indicating motion blur with respect to a moving subject. According to embodiments, the CEP may refer to a technique of modulating a motion through a series of processes of opening and closing a shutter or turning on and off an illumination within a time for capturing one frame.

According to embodiments, in Equation 15, instead of calculating $B_2^{-1}$ of $$\sum_{k=1}^{\frac{K}{2}} B_1\big(B_2^{-1}(b[n_1 - 2k + 1])h[2k]\big),$$

a coded pattern may be generated so that h[2k] becomes 0.

That is, a color image $d_h$ having motion blur may be defined as a convolution relation ($d_h = d*h$) of a clear color image d and motion blur h, and CEP may be defined as a technique ($d_h{}^{CEP} = d*h^{CEP}$) of modulating the motion blur h. Referring to FIG. 4, when the CEP is not used, a clear image can be acquired only when $B^{-1}$ is calculated. However, in an embodiment of the present invention, h may be modulated using a coded pattern to handle only the signals on the same color filter.

Figure 5:
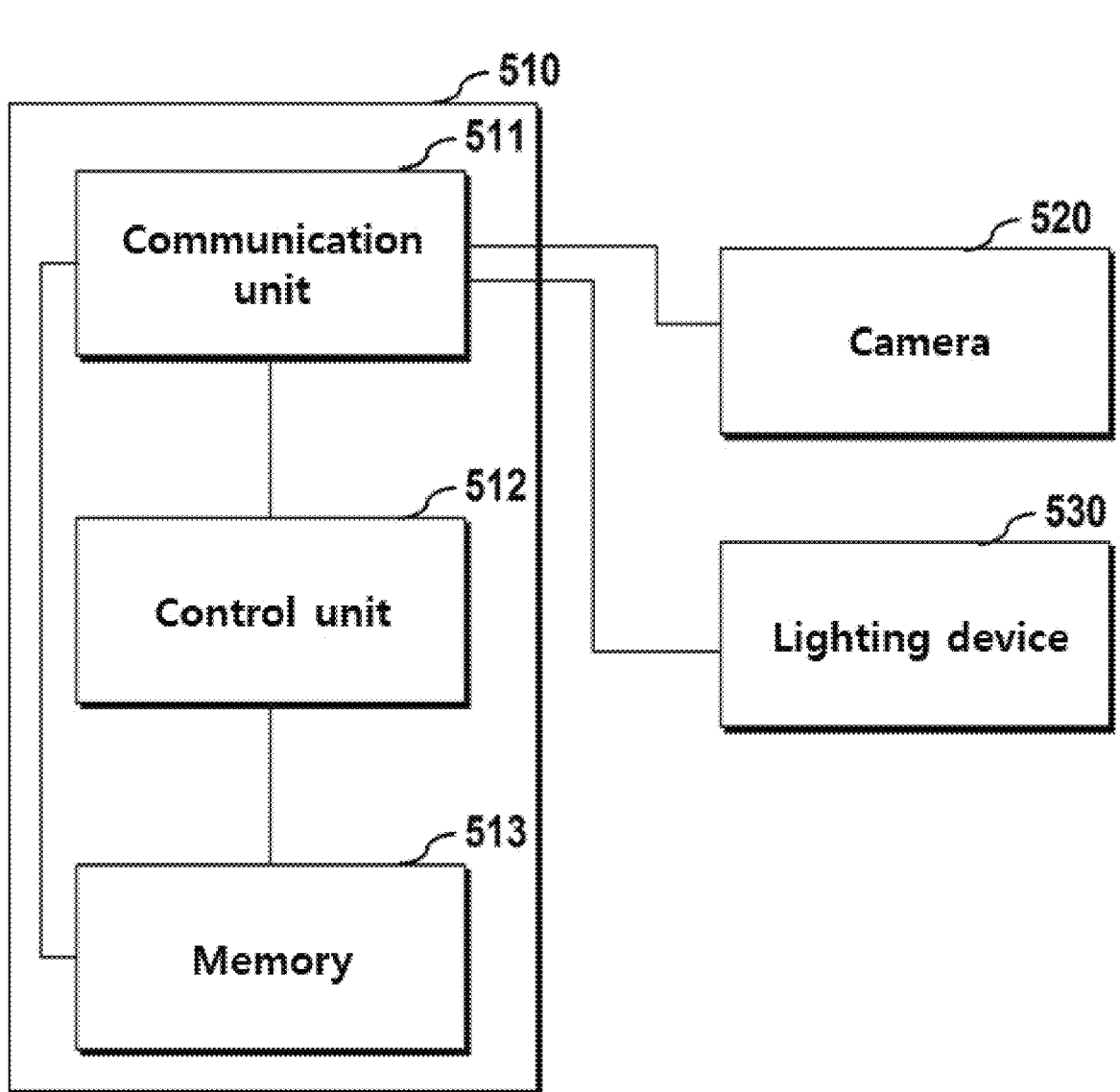
FIG. 5 is a block diagram for explaining an apparatus for reconstructing an image using motion deblurring according to one embodiment of the invention.
Figure 6:
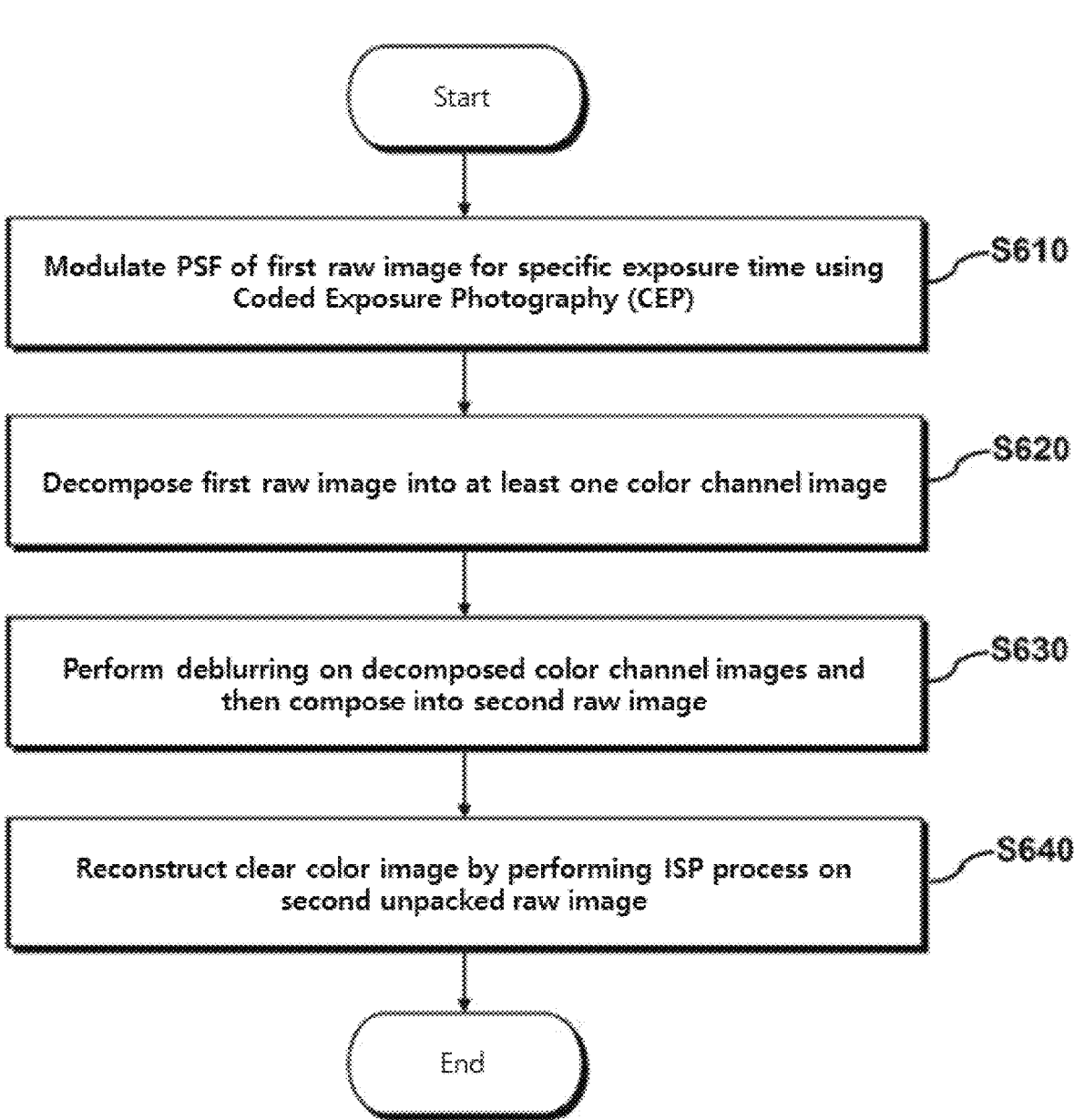
FIG. 6 is a flowchart illustrating a method of reconstructing an image using motion deblurring according to an embodiment of the present invention.
Figure 7:
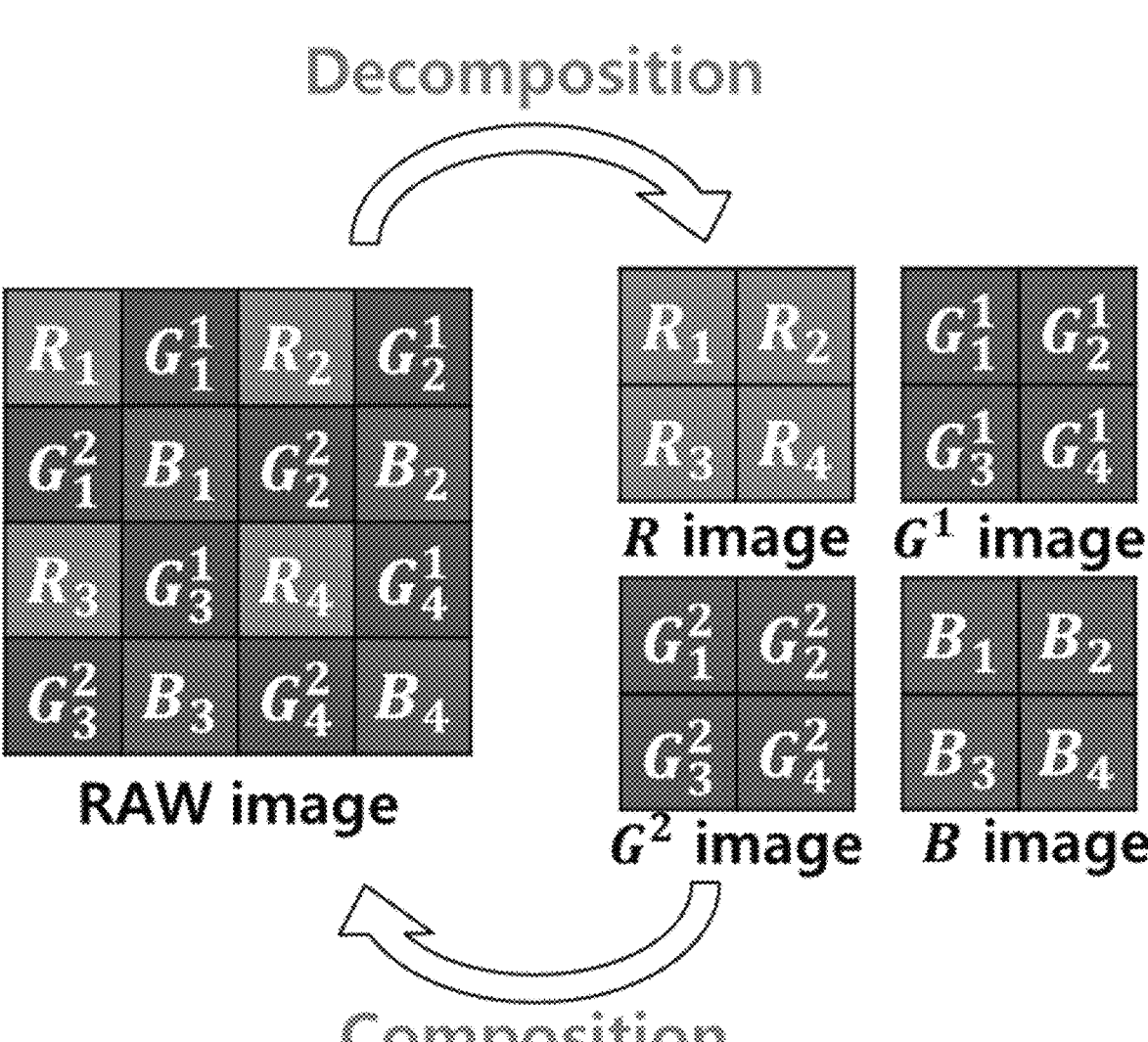
FIG. 7 is a view for explaining a decomposition and composition process according to an embodiment of the present invention.
Figure 8:
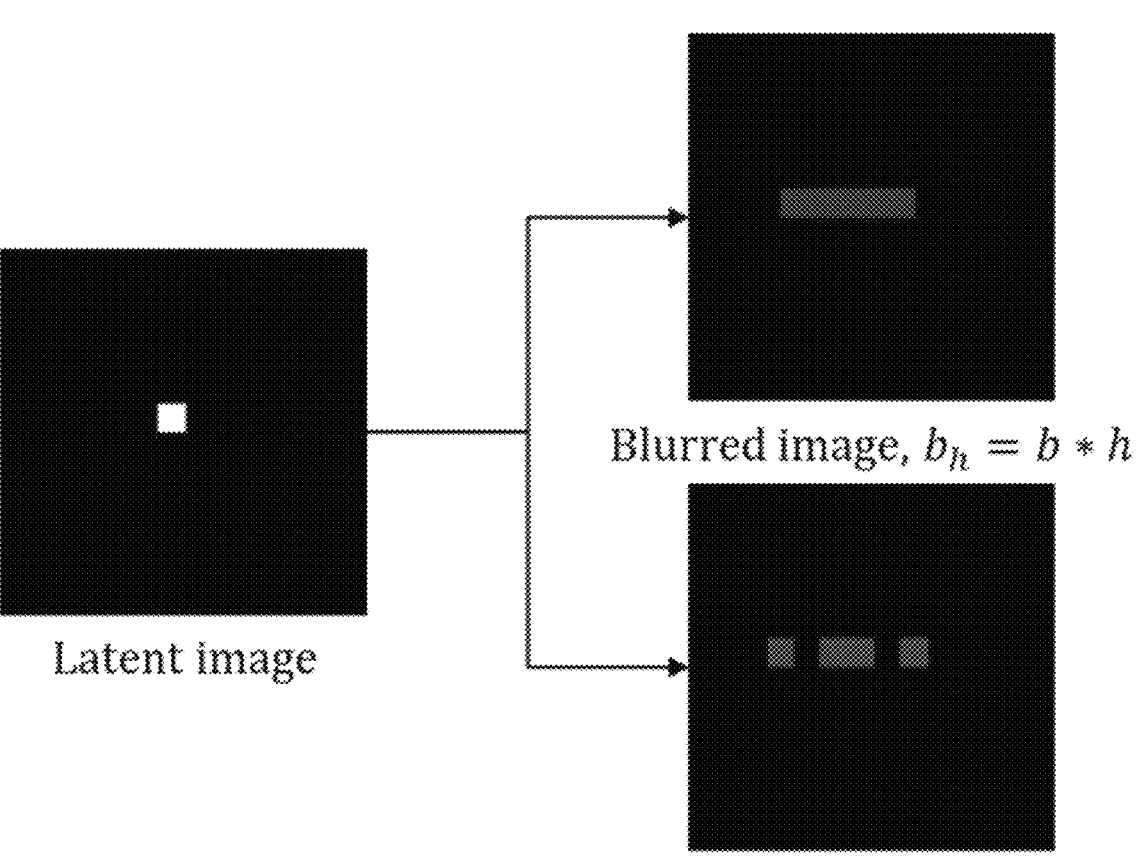
FIG. 8 is a view for explaining Coded Exposure Photography (CEP) according to an embodiment of the present invention.

FIG. 5 is a block diagram for explaining an apparatus for reconstructing an image using motion deblurring according to one embodiment of the invention, FIG. 6 is a flowchart illustrating a method of reconstructing an image using motion deblurring according to an embodiment of the present invention, FIG. 7 is a view for explaining a decomposition and composition process according to an embodiment of the present invention, and FIG. 8 is a view for explaining Coded Exposure Photography (CEP) according to an embodiment of the present invention.

Referring to FIG. 5, an apparatus 510 for reconstructing an image using motion deblurring may include a communication unit 511 for acquiring a raw image from a camera 520 during a specific exposure time, a control unit 512 for performing a decomposition process, a deblurring process, and a composition process on the raw image acquired from the communication unit 512, and a memory 513 for storing related information such as exposure time and the like, in addition to an image reconstruction algorithm.

However, the apparatus 510 for reconstructing an image using motion deblurring does not necessarily include all of the communication unit 511, the control unit 512, and the memory 513, and may include only some components according to embodiments.

According to embodiments, the communication unit 511 may receive a first raw image from the camera 520.

The communication unit 511 may receive a raw image having motion blur by capturing a moving state of a subject using the camera 520, and receive a raw image modulated considering arrangement of the CFA.

In addition, the communication unit 511 may receive a raw image generated based on motion information acquired using a sensor such as a speedometer, a gyro sensor, or the like.

According to embodiments, the communication unit 511 may receive a raw image from the camera 520 and receive information on exposure time, shutter speed, and the like. In addition, the communication unit 511 may receive information on the output time of illumination from a lighting device 530.

According to embodiments, the communication unit 511 may transmit control information for each of the camera 520 and the lighting device 530 from the control unit 512, and the control unit 512 may control the camera 520 and the lighting device 530 through the control information.

The control unit 512 may modulate the first raw image using Coded Exposure Photography (CEP).

More specifically, the control unit 512 may modulate the point spread function (PSF) of the raw image for a specific exposure time using CEP (S610).

At this point, the raw image may be modulated using a coded pattern determined according to a motion and arrangement of the color filter array.

Here, the motion may be movement of a subject.

According to embodiments, the CEP may indicate a technique of modulating the PSF, the PSF may indicate a relation between a scene and the camera, and may be defined as a function indicating motion blur for a moving object.

According to embodiments, the control unit 512 may use a coded shutter or coded illumination to modulate the PSF.

Specifically, the control unit 512 may modulate the exposure time while opening and closing the shutter of the camera 520 according to the coded shutter, and additionally control an external shutter of the camera 520, or modulate the exposure time by handling the internal shutter of the camera (shutter-based H/W).

In addition, the control unit 512 may modulate the exposure time while performing on/off switching of the lighting device 530 according to the coded illumination (illumination-based H/W), or modulate motion blur while changing brightness or intensity of the lighting device.

That is, the control unit 512 may modulate motion blur through an exposure time using the shutter of the camera 520 or the lighting device.

In an embodiment of the present invention, motion blur and motion may be used as the same meaning.

According to embodiments, intensity of photons received during the exposure time T of the camera 520 in one pixel in a raw image may be calculated by time integral of irradiance B(L(x,t)) that has passed through the camera sensor located at position x during the exposure time T as shown in Equation 16.

$$I_F(x) = \int_0^T B_F(L(x, t))dt \qquad \text{[Equation 16]}$$

Referring to FIG. 8, a color image $d_h$ having motion blur may be defined as a convolution relation ($d_h = d*h$) between a clear color image d and motion blur h, and CEP may be defined as a technique of modulating ($d_h{}^{CEP} = d*h^{CEP}$) the motion blur h. For example, when h is $\frac{1}{6}$ [111111] and the coded pattern is [101101], the CEP may be as shown in FIG. 8.

According to embodiments, the coded pattern may be optimized so that the minimum value may be maximized in the frequency conversion result $H^{CEP}$ of $h^{CEP}$, to which the coded pattern is applied, and may be expressed as $\text{argmax}_U \min (H^{CEP})$, and U may indicate the coded pattern.

According to embodiments, when it is assumed that the motion can be known in advance, since the width and height of a decomposed image are $\frac{1}{2}$ of the original image, the length of the coded pattern is $\frac{1}{2}$ of the PSF. The coded pattern having a length of $\frac{1}{2}$ may be calculated as $\text{argmax}_U \min (H^{CEP})$.

The control unit 512 may generate a coded pattern considering at least any one among a global motion generated by a relative motion between a scene of a raw image and a camera, a local motion of an object, and the color filter array in the camera.

That is, the control unit 512 may generate a coded pattern using at least any one among the length of the PSF, the motion of the PSF, and the color filter array.

The control unit 512 may modulate a pattern on the basis of motion.

For example, when it is assumed that a moving object moves 8 pixels horizontally at a constant speed during a specific exposure time, h=⅛[11111111] in this case.

At this point, when the coded pattern is optimized using the proposed method, it is assumed that the length of the pattern is 4, which is ½ of the length of 8 pixels of motion blur, and the optimized coded pattern is [1001].

Here, the intervals of the RAW image in the RGGB pattern are equal, i.e., 1 pixel.

Therefore, 0 is inserted between the digits of the generated coded pattern ([10000010]).

At this point, since the coded pattern becomes 0 unconditionally at the moment when a moving object moves from one pixel to an adjacent pixel, when a mosaicked raw image is decomposed into individual color channel images, each of the decomposed color channel images is independent and has modulated motion blur having a length of 4 pixels.

In other words, when it is assumed that the length of the PSF(h) is K, a coded pattern U having a length of K/2 is generated, and the coded pattern U may be determined by substituting 0 at the position of the coded pattern at the moment when a moving object moves 1 pixel considering the motion of the PSF (e.g., acceleration, rotation, etc.) and arrangement of the CFA (e.g., Bayer RGGB pattern) of the raw image.

That is, the code is determined based on information on the motion, such as speed, direction, and the like, and arrangement of the color filter array.

According to embodiments, the control unit 512 may decompose the raw image of the RGGB pattern into at least one color channel image supported by the camera (S620). For example, the color channel image may be four images of R (red), G1 (green), G2 (green), and B (blue).

At this point, the control unit 512 may decompose the raw image into a color channel image in correspondence to the pixel color filter moving along the time while the shutter of the camera 520 or the lighting device moves along the pixels of the raw image.

Figure 9:
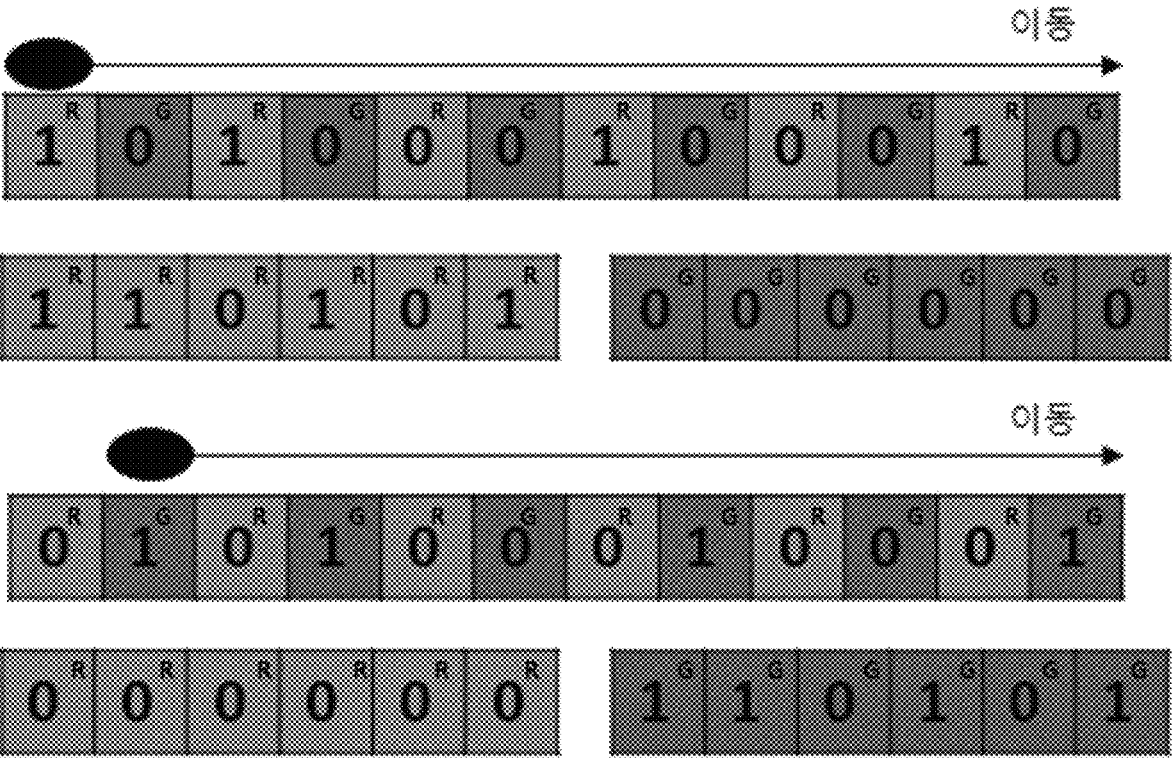
FIG. 9 is a view for explaining a process of decomposing a raw image into a color channel image.

FIG. 9 is a view for explaining a process of decomposing a raw image into a color channel image.

As shown in FIG. 9, the control unit 512 may decompose a raw image into at least one color channel image by determining on/off of the pixel color filter moving along the time while the shutter of the camera or the lighting device moves along the pixels of the raw image in the raw image of the RGGB pattern.

More specifically, when it is assumed that the shutter of the camera or the lighting device moves by 12 pixels, the red (R) color channel image may be decomposed by turning on/off only the red (R) color filter, and the green (G) color channel image may be decomposed by turning on/off only the green (G) color filter.

That is, in the raw image acquired on the basis of the CFA, the control unit 512 may decompose R, G, and B color channels according to the pixels of the raw image through the shutter of the camera or the lighting device.

At this point, although it is illustrated, in an embodiment of the present invention, that the shutter of the camera or the lighting device is turned on/off by 1 pixel to decompose a color channel image, a plurality of color channel images may be decomposed by grouping a plurality of pixels and simultaneously filtering colors through on/off of the shutter of the camera or the lighting device.

According to embodiments, the control unit 512 may perform a deblurring process on the decomposed color channel images and then compose the color channel images into a raw image (S630).

According to embodiments, the control unit 512 may perform deblurring on each image using a kernel configured of only odd-numbered elements among the elements constituting the PSF.

According to embodiments, the control unit 512 may reconstruct a clear color image by performing an ISP process on the composed raw image (S640).

Figure 10:
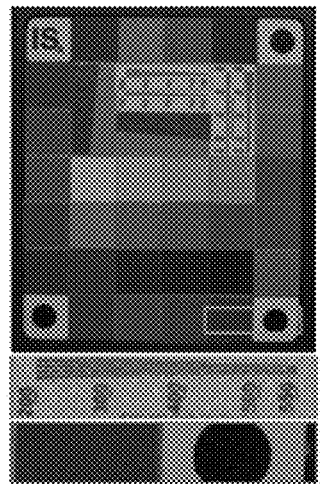
FIG. 10 is a view for explaining an effect according to an apparatus for reconstructing an image using motion deblurring and a method thereof according to an embodiment of the present invention.
Figure 10:
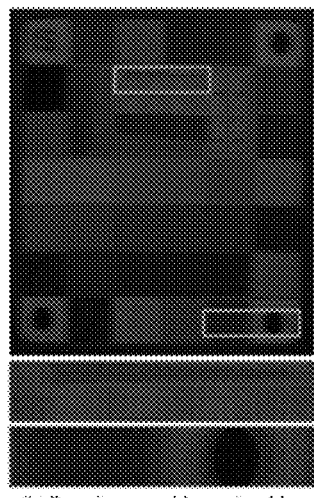
Figure 10:
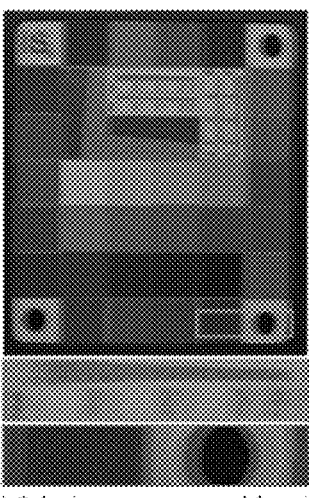
Figure 10:
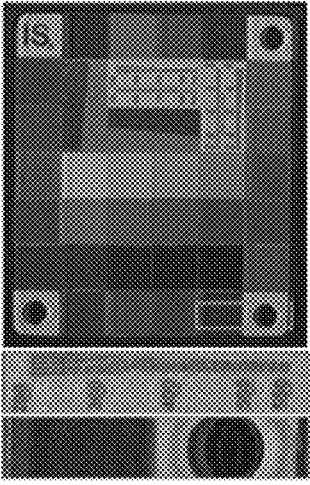
Figure 10:
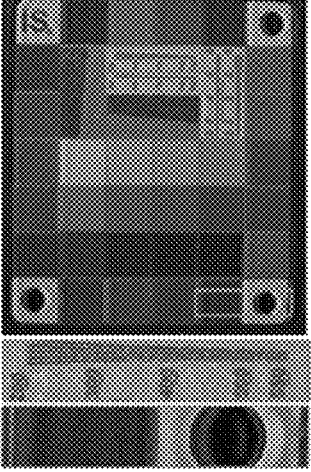
Figure 10:
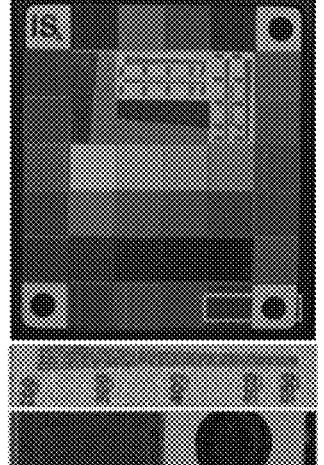

FIG. 10 is a view for explaining an effect according to an apparatus for reconstructing an image using motion deblurring and a method thereof according to an embodiment of the present invention.

Referring to FIG. 10, an experiment has been performed using composition data in order to evaluate usefulness of the algorithm according to an embodiment of the present invention. A blurred color image is generated on the basis of Equation 11, and the process of $B^{-1}$ is omitted and a clear color image is reconstructed by applying CEP in Equation 2 in the case of the prior art and in Equation 12 in the case of the proposed method.

For the experiment, RAW format 12 bit mosaic data has been captured using a Basler 2040-120 uc CMOS color camera.

Meanwhile, according to an embodiment of the present invention, it is possible to provide a computer-readable recording medium on which a program for executing the above-described method in a computer is recorded. In other words, the method described above may be written as a program that can be executed on a computer, and may be implemented in a general-purpose digital computer that operates the program using a computer-readable medium. In addition, the structure of data used in the above method may be recorded on a computer readable medium through various means. It should not be understood that a recording medium recording an executable computer program or code for performing various methods of the present invention includes temporary objects such as carrier waves or signals. The computer readable medium may include a storage medium such as a magnetic storage medium (e.g., ROM, floppy disk, hard disk, etc.) or an optical readable medium (e.g., CD-ROM, DVD, etc.).

Although the present invention has been described in detail through representative embodiments, those skilled in the art will understand that various modifications will be possible to the embodiments described above without departing from the scope of the present invention. Therefore, the scope of the present invention should not be defined to be limited to the described embodiments, but should be defined by all changes or modified forms derived from the claims and equivalent concepts, as well as the claims described below.

What is claimed is:

1. A method of reconstructing an image using motion deblurring, the method comprising:

modulating a first raw image using Coded Exposure Photography (CEP) by controlling at least one of a camera shutter operation and a lighting device operation based on motion information acquired from one or more sensors; and decomposing the first raw image into at least one color channel image, the decomposing including separating raw mosaic sensor data into individual color channels before performing Image Signal Processing (ISP) operations, wherein the modulating of the first raw image using CEP includes modulating the first raw image using a coded pattern determined according to a motion and arrangement of a color filter array (CFA).

2. The method according to claim 1, further comprising generating a coded pattern considering at least any one among a global motion generated by a relative motion between a scene of the first raw image and a camera, a local motion of an object, and the CFA in the camera, wherein the coded pattern is optimized to maximize a minimum frequency response during subsequent deblurring operations.

3. The method according to claim 1, further comprising modulating motion blur while opening and closing a shutter of a camera according to a coded shutter, or modulating motion blur while performing on/off switching of a lighting device or changing brightness of the lighting device according to coded illumination.

4. The method according to claim 1, further comprising:

performing a deblurring process on decomposed at least one color channel image and composing the decomposed at least one color channel image into at least one second raw image; and performing image signal processing (ISP) on the composed at least one second raw image, wherein the ISP processing includes at least gamma correction and demosaicking operations performed after the deblurring process.

5. A method of reconstructing an image using motion deblurring, the method comprising:

modulating a first raw image using Coded Exposure Photography (CEP); and decomposing the first raw image into at least one color channel image;

modulating motion blur while opening and closing a shutter of a camera according to a coded shutter, or modulating motion blur while performing on/off switching of a lighting device or changing brightness of the lighting device according to coded illumination, wherein the modulating of the first raw image using CEP includes modulating the first raw image using a coded pattern determined according to a motion and arrangement of a color filter array (CFA), wherein the decomposing including separating raw mosaic sensor data into individual color channels before performing Image Signal Processing (ISP) operations.

6. The method of claim 5, wherein the modulating the first raw image using CEP involves controlling at least one of a camera shutter operation and a lighting device operation based on motion information acquired from one or more sensors.

* * * * *